(12) United States Patent
Yousofi

(10) Patent No.: US 7,181,433 B2
(45) Date of Patent: Feb. 20, 2007

(54) VALIDATION OF TRANSACTIONS

(75) Inventor: Siamack Yousofi, Canberra (AU)

(73) Assignee: CMX Technologies Pty Ltd., New South Wales (AU)

( * ) Notice: Subject to any disclaimer, the term of this patent is extended or adjusted under 35 U.S.C. 154(b) by 429 days.

(21) Appl. No.: 10/362,780

(22) PCT Filed: Aug. 20, 2001

(86) PCT No.: PCT/AU01/01029

§ 371 (c)(1),
(2), (4) Date: Jul. 11, 2003

(87) PCT Pub. No.: WO02/17556

PCT Pub. Date: Feb. 28, 2002

(65) Prior Publication Data

US 2005/0075973 A1    Apr. 7, 2005

(30) Foreign Application Priority Data

Aug. 22, 2000   (AU) .................................. PQ 9584

(51) Int. Cl.
*G06Q 99/00* (2006.01)
(52) U.S. Cl. .............................. 705/67; 705/50; 705/64; 705/75; 380/200; 380/202; 380/228; 380/277; 726/2; 726/3; 726/4; 726/5; 713/182; 713/183; 713/184; 713/185; 713/186
(58) Field of Classification Search ............ 705/50–79; 380/200–202, 228, 277; 726/2–5; 713/182–186
See application file for complete search history.

(56) References Cited

U.S. PATENT DOCUMENTS 4,590,470 A    5/1986  Koenig (Continued)

FOREIGN PATENT DOCUMENTS

DE           43 03 888 C1      2/1993

(Continued)

OTHER PUBLICATIONS

The Spectrum Game Database: Jet Set Willy, http://jswremakes.emuunlim.com/authors/smith/jsw.txt, date accessed: Oct. 1, 2004.

(Continued)

*Primary Examiner*—Jalatee Worjloh
(74) *Attorney, Agent, or Firm*—Knobbe Martens Olson & Bear LLP

(57) ABSTRACT

The invention relates to a process of validation for transactions between a user terminal and a server of the type involving: "Request, Challenge, Response, Verification and Approval". In other aspects it also relates to a computer network, server or terminal for performing the method, as well as a physical key. It involves providing a code word made up of a first series of elements to a user. Providing a key to the user to use to scramble the code word. Holding the code word and key securely at the server; Receiving a request communication at the server from a user terminal. Responding to the request by issuing a second series of elements from the server to the user terminal. Displaying the second series of elements at the terminal. Inviting the user to enter a scrambled version of the code word by selecting the elements of the first series in order from the second series and for each element selected making an entry at the terminal in dependence on the key to create a series of entries. And using the series of entries to validate the transaction.

14 Claims, 11 Drawing Sheets

U.S. PATENT DOCUMENTS

| | | | |
|---|---|---|---|
| 4,614,861 A * | 9/1986 | Pavlov et al. | 235/380 |
| 4,652,698 A * | 3/1987 | Hale et al. | 713/155 |
| 4,926,481 A * | 5/1990 | Collins, Jr. | 713/184 |
| 5,712,627 A | 1/1998 | Watts | |
| 5,818,030 A * | 10/1998 | Reyes | 235/492 |
| 6,061,790 A | 5/2000 | Bodnar | |
| 6,085,320 A | 7/2000 | Kaliski, Jr. | |
| 6,148,406 A * | 11/2000 | Weisz et al. | 726/18 |
| 6,802,000 B1 * | 10/2004 | Greene et al. | 713/168 |
| 6,909,424 B2 * | 6/2005 | Liebenow et al. | 345/169 |
| 6,941,282 B1 * | 9/2005 | Johnson | 705/44 |

FOREIGN PATENT DOCUMENTS

| | | |
|---|---|---|
| EP | 0 851 335 | 7/1998 |
| JP | 10154977 | 6/1998 |
| JP | 10 307799 | 2/1999 |
| WO | WO 96/34328 | 10/1996 |

OTHER PUBLICATIONS

XP-002298815, Sep. 29, 2004, p. 1 of 1.

* cited by examiner

FIG. 10

| 1 | 4 | 6 | 3 | 2 | 5 | 9 | 0 | 8 | 7 |

Align the strip on your card with the numbers below

81 — (pointer to coding strip)

SUBMIT   RESET

1. Align the coding strip on your credit card with the numbers above.
2. Translate your PIN into its adjacent letters on the coding strip.
3. Enter the translation of your PIN (letters only) in the text box.
4. To complete the transaction press SUBMIT. (To start over press RESET)

Never disclose your PIN!

VALIDATION OF TRANSACTIONS

TECHNICAL FIELD

The invention relates to a process of validation for transactions between a user terminal and a server of the type involving: "Request, Challenge, Response, Verification and Approval". In other aspects it also relates to a computer network, server or terminal for performing the method, as well as a physical key.

BACKGROUND ART

It is commonly accepted that at present the success or failure of consumer e-commerce depends heavily on an acceptable solution to the problem of security of online payments. Most current technologies are complex and depend heavily on strong encryption, public key infrastructures (PKI), digital certificates and digital signatures. Some other technologies such as biometrics and smart cards require specialised hardware for their implementation.

SUMMARY OF THE INVENTION

In a first aspect the invention is a method of validation for transactions between a user terminal and a server, including the steps of:

Providing a code word made up of a first series of elements to a user.

Providing a key to the user to use to scramble the code word.

Holding the code word and key securely at the server.

Receiving a communication at the server from a user terminal (request).

Responding to the request by issuing a second series of elements from the server to the user terminal (challenge).

Displaying the second series of elements at the terminal.

Inviting the user to enter a scrambled version of the code word by selecting the elements of the first series in order from the second series and for each element selected making an entry at the terminal in dependence on the key to create a series of entries. And Using the series of entries to validate the transaction.

The communication may take the form of a User ID entered at the terminal, and the code word may be a PIN.

The second series of elements may be a random series of elements. The elements of the sequence may simply be the ten digits 0 to 9. However, any combination of character, symbols, digits or graphic elements can be used.

The key may include a physical body bearing visible indicia connecting pairs of points each of which is located at an internal or external edge of the body. Alternatively, the key may display, say printed, information which may appear along an edge of the key, or near apertures in the key.

The Key enables a user to co-relate the position of a point on a visual display to the position of a second point on the same display by holding the Key against the screen. The user may then capture data displayed at the second point by means of an input device. Alternatively, by aligning information printed on the key with the second series of elements displayed on the user terminal, entries may be made from the information printed on the key to select elements of the first series.

The Key may be of any appropriate shape and size and made of any appropriate material. For example the Key can be rectangular, made of paper, cardboard or plastic and be 85×21 millimeters in dimensions. Alternatively the Key may resemble a credit card in size and construction material.

In some cases the key may include apertures through which information on the underlying screen can be viewed. The key may also include marks which may be clicked while the key is held against the screen to make entries.

Coloured arrows on the key may help the user to first align the key with predetermined points on the screen and then click the screen coordinate represented by the tip of the arrow.

The arrows can vary in size, colour and shape as long as they provide a visual connection between two points, areas or objects displayed on the underlying screen. The arrows may begin and end at edges of the key, which may be external edges or edges of apertures in the key.

The communication (request) may include calibration data for the terminal generated by the user making entries depending on the size, shape or configuration of the physical body of the key. These entries may be made by holding the key against the screen and clicking at points indicated by the key, such as at the edge of the key.

The server may use the calibration data to display the second series of elements (challenge) and a series of entry buttons at the terminal such that the key may be positioned on the terminal to link the elements of the second series with respective entry buttons.

The user may enter a scrambled version of the code word by selecting the elements of the first series in order from the second series and for each element selected clicking the respective entry button to make a series of entries.

The method may include the further steps of transmitting the series of entries made at the terminal to the server (response).

Unscrambling the entries to recover the code words using knowledge of the second series and the key, to validate the user (verification).

Accepting or rejecting the request in dependence on the applicable business rules (approval).

The transmission of the series of entries (response) may involve transmission of the scrambled version of the code word.

After the scrambled codeword is entered and submitted the server interprets the data and verifies the codeword (verification). Depending on the applicable business rules, the server proceeds to approve or reject the transaction (approval).

Alternatively, the method may include the further steps of using the series of entries made at the terminal to encrypt a transmission to the server, and decrypting the transmission at the server.

Extra security layers in the form of electronic processes such as encryption or procedural policies may be used in addition to the steps outlined.

The invention maybe used for:

Online payments for goods and services purchased on the Internet

Electronic Cash

Internet Banking/Electronic Banking

Automatic Teller Machine transactions

EFTPOS transactions

Security access to physical and virtual spac s

Other similar situations.

The invention is designed to work with common Visual Display Units (VDU) used in (but not limited to) devices such as:

Personal computers (monitors)
Mainframe computers (terminals)
Hand held computers
Mobile phones
Internet appliances
Electronic Information Kiosks
Interactive television sets
Other similar devices.

The invention also requires an Input Device such as a:
Computer mouse
Touch pad
Touch screen
Stylus pen (as used in hand-held devices)
Keyboard
Other similar devices.

In another aspect the invention is a computer network, server or terminal for performing the method.

In a further aspect the invention is a Key comprising a physical body bearing visible indicia connecting pairs of points at an edge of the body for use in the method.

The Key facilitates manual scrambling or encrypting of passwords and PIN numbers. The actual process of scrambling or encryption takes place at the terminal (and involves the user's brain) but depends on the presence of the Key and knowledge of the User ID and PIN.

This invention can be used either independently, replacing many current security products pertaining to the Internet and other forms of online payments and fund transfers, or in conjunction with such existing products to provide additional security and accountability.

All encryption can be broken and all security measures can be defeated. Security risks can never be totally eliminated. However, over many decades and after many failures, financial institutions have developed security measures and policies that help manage the risk by reducing them to acceptable levels. For example, PIN numbers and passwords are periodically changed or cards are captured and accounts suspended after 3 consecutive incorrect PIN entries. All of these time-tested and well-understood policies can be applied to the use of this invention.

When using the current EFT or ATM technology, we depend on three elements namely a physical card, an account number and a PIN. This invention allows us to use the same three elements on public networks such as the Internet.

Subject to correct implementation, this invention can provide the same or better level of security as the existing EFT technology without the need for expensive specialised hardware or complex software.

The Key has an exceptionally simple design. It can be constructed from a variety of materials including paper, cardboard, plastic, rubber, wood, or metal through simple manufacturing processes.

Unlike credit cards with magnetic strips or smart cards with built-in computer chips, this invention does not need re-encoding or re-programming and is not susceptible to electro-magnetic interference therefore extremely reliable and fail-safe.

These attributes lead to substantial manufacturing, operational and administrative cost savings.

The Key can be used with almost any type of Visual Display. It is even possible to use it on paper-based documents to create a confidential signature.

The KEY can be used in a variety of circumstances from Internet shopping to providing security access to buildings. New applications can be identified and implemented without the need to change the design of the Key.

A variety of algorithms and business rules can be implemented and continually modified and improved without the need to replace the Key or change its design.

Many Internet security products claim to provide a "card is present" environment. The concept of card's presence has legal significance in deciding the liabilities of the user, the merchant and the bank. This invention provides one of the strongest claims to providing "card is present" environment on the Internet.

Many instances of large-scale theft of credit card numbers used for Internet shopping have been reported in recent years and the problem is worsening due to increasing involvement of organised crime syndicates and sophistication of cyber-criminals.

Some instances involve hundreds of thousands credit card numbers. Reducing the risk requires adherence to strict security measures by all users, ISPs, merchants, banks and other service provider. The open and ad-hoc nature of the Internet limits the enforceability of such measures.

This invention employs a physical Key that cannot be stolen on-line. Even when physically stolen or lost the Keys are compromised only one at a time.

Unlike digital encryption keys (private and public), digital certificates, digital signatures, public key infrastructures (PKI) and encryption software, this invention's physical Key is immune from computer viruses and attacks by hackers and cyber-terrorists.

The use of this invention does not require a high level of computer literacy. For the average user it is easier to learn how to use this invention than grasp the concept of private and public encryption keys and their handling and safe keep.

This invention closely emulates EFTPOS and a "card is present" environment. Therefore, this invention may provide better compatibility with current legal framework governing on-line transactions than many alternative technologies. For the same reasons the Key also facilitates better allocation of responsibilities, liabilities and accountabilities.

To use the invention the user must first have possession of the Key and knowledge of the User ID and PIN and then physically hold the Key against a screen and enter values using a pointing device. A person who can fulfil all these conditions but who is not the intended legal user is less likely to reside in a far away place or able to completely cover his tracks and eliminate all clues. Therefore, the invention simplifies fraud detection and has a high forensic value. Law-enforcement agencies that currently struggle to bring cyber-criminals to justice can benefit from this invention.

Because there is no need to incorporate magnetic strips or microprocessor chips into the Key, it can be issued in an everlasting and durable form eliminating many instances that require card re-issue.

This invention need not render current technologies such as encryption obsolete. It can simply be used to provide an additional layer of security or extend the useful life of the underlying technology.

A further aspect of the invention is a one-time pad of disposable Keys. In this scenario the Key can be assigned a pre-defined dollar value to act as Electronic Cash or have the value defined by the user at the time of transaction to act as an Electronic Withdrawal Slip.

BRIEF DESCRIPTION OF THE DRAWINGS

Examples of the invention will now be described with reference to the accompanying drawings, in which:

FIGS. 9 through 12 are screenshots illustrating the steps of the validation process using a second type key.

BEST MODES OF THE INVENTION

Figure 1A:
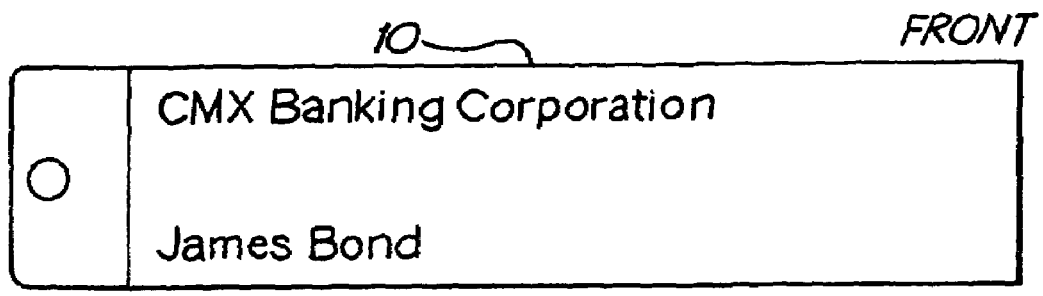
FIGS. 1a, 1b and 1c are respectively the front and two alternative rear views of a self contained key corresponding to a first and a second type.

Assume you have selected (or received) a Personal Identification Number; your PIN is 2016.

The sequence of digits 0 to 9 in the strip below represents a "challenge".

| 0 | 1 | 2 | 3 | 4 | 5 | 6 | 7 | 8 | 9 |

If you were asked to point at the digits of your PIN on this challenge strip, you would respond as follows:

| 0 | 1 | 2 | 3 | 4 | 5 | 6 | 7 | 8 | 9 |
| $b_2$ | $b_3$ | $b_1$ | | | | $b_4$ | | | |

2016 = 2016

Now add a second strip that includes any 10 letters of the alphabet placed adjacent to the 10 digits of our challenge strip. We can call this the "response" strip.

| 0 | 1 | 2 | 3 | 4 | 5 | 6 | 7 | 8 | 9 |
| Q | N | S | A | H | E | X | Z | L | P |

If you were asked to translate your PIN into adjacent letters using the strips above you would respond as follows.

| 0 | 1 | 2 | 3 | 4 | 5 | 6 | 7 | 8 | 9 |
| Q | N | S | A | H | E | X | Z | L | P |
| $b_2$ | $b_3$ | $b_1$ | | | | $b_4$ | | | |

2016 = SQNX

We now repeat the previous example 3 times but each time shuffle the digits in the challenge strip at random. You are still required to translate your PIN into adjacent letters.

| 7 | 0 | 5 | 2 | 8 | 4 | 9 | 3 | 1 | 6 |
| Q | N | S | A | H | E | X | Z | L | P |
| | $b_2$ | | $b_1$ | | | | | $b_3$ | $b_4$ |

2016 = ANLP

| 5 | 3 | 1 | 7 | 9 | 0 | 8 | 2 | 6 | 4 |
| Q | N | S | A | H | E | X | Z | L | P |
| | | $b_3$ | | | $b_2$ | | $b_1$ | $b_4$ | |

2016 = ZESL

| 0 | 9 | 3 | 8 | 4 | 1 | 6 | 6 | 2 | 7 |
| Q | N | S | A | H | E | X | Z | L | P |
| $b_2$ | | | | | $b_3$ | | $b_4$ | $b_1$ | |

2016 = LQEZ

Note: The elements within the response strips in all these examples remain unchanged and represent predetermined Fixed Values. (QNSAHEXZLP)

Now referring to the following diagram we shall insert a strip between the challenge and Response strips and call it the Encoder or the KEY. The encoder includes arrows that connect digits to non-adjacent letters. You use the arrows to translate your PIN into letters, (Remember to follow the arrows)

| 7 | 0 | 5 | 2 | 8 | 4 | 9 | 3 | 1 | 6 |
| Q | N | S | A | H | E | X | Z | L | P |
| | | | $b_3$ | | | | $b_4$ | $b_2$ | $b_1$ |

2016 = PLAZ

In the next two diagrams we repeat the previous example twice shuffling both the digits and the letters at random. We can even change any of the letters in the response strip. The orientations of the arrows on the Encoder (KEY) shall remain unchanged.

| 2 | 1 | 4 | 3 | 7 | 6 | 0 | 5 | 9 | 8 |
| A | H | J | B | C | E | Z | M | X | T |
| $b_4$ | | | | $b_1$ | $b_2$ | | | $b_3$ | |

2016 = CEXH

-continued

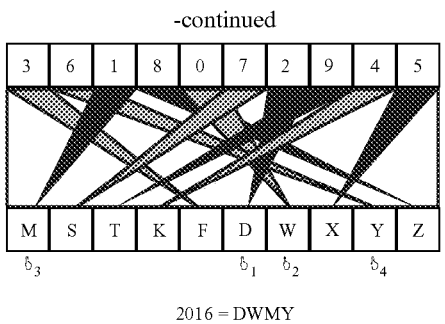

2016 = DWMY

The elements within the response strips in these examples change at random and no longer represent predetermined fixed values. However, The arrows remain unchanged and represent Relative Positions.

In the last example the shape and color of the arrows are enhanced to provide better visual guidance.

The following examples relate to a process of validating a user's identity during online payment for goods or services purchased on the Internet using a personal computer. The process involves the steps of "Request, Challenge, Response, Verification and Approval". The process also involves the use of a physical Key.

Figure 1B:
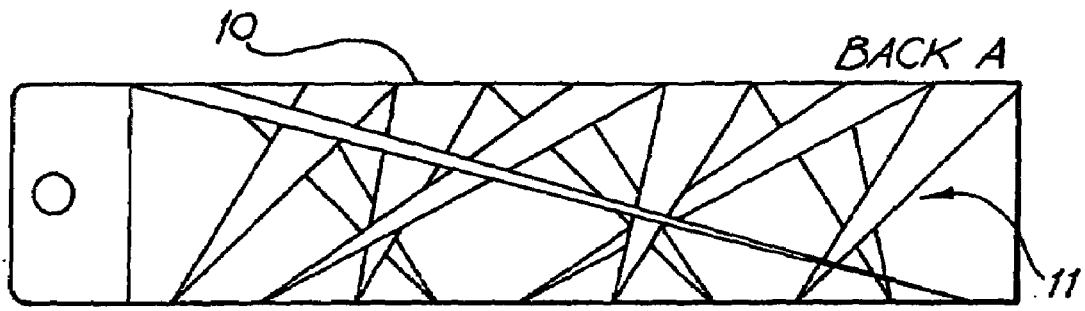
Figure 1C:
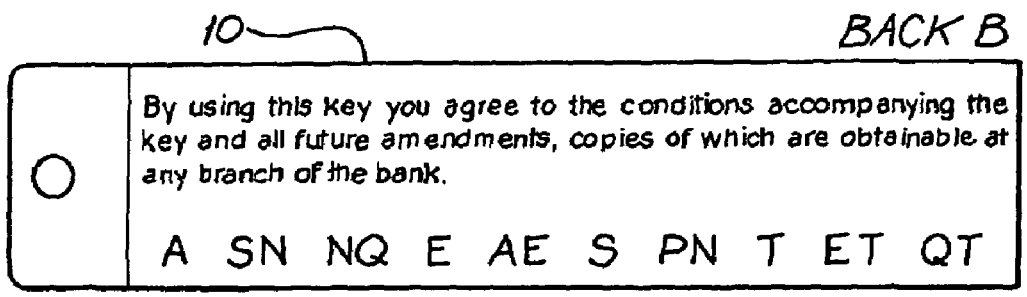

In a first example, the Key is rectangular, made of paper, cardboard or plastic and 85×21 millimeters in dimensions as shown at 10 in FIGS. 1a, 1b and 1c.

Figures 2, 3:
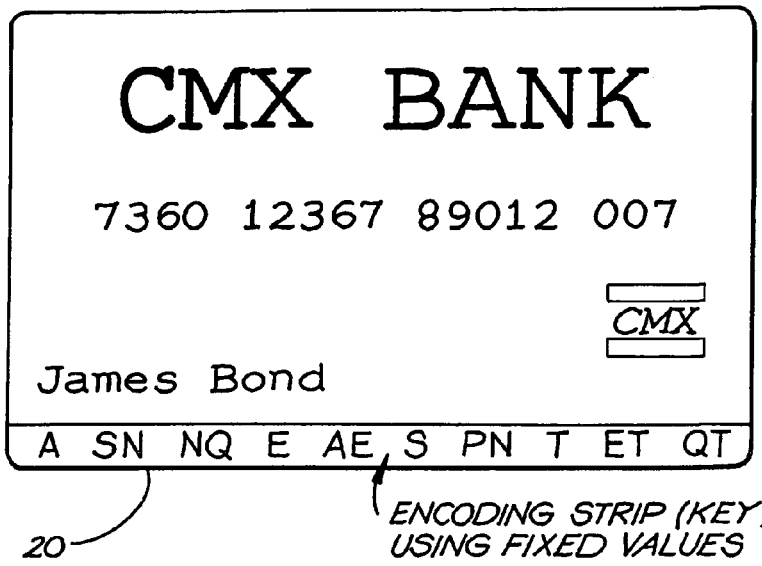
FIG. 2 is a view of a second type key incorporated into a credit card.
FIG. 3 is a view of a second type key incorporated into a cheque.

Alternatively, the Key is sized the same as a credit card and constructed of the same material, as shown at 20 in FIG. 2.

The triangular shaped areas, indicated generally at 11 on FIG. 1b represent "ARROWS" that are used to first align the card with predetermined points on a screen and then click the screen co-ordinate represented by the tip of the arrow.

The arrows 11 can vary in size, colour and shape as long as they provide a visual connection between two points, areas or objects displayed on the underlying screen.

Figure 4:
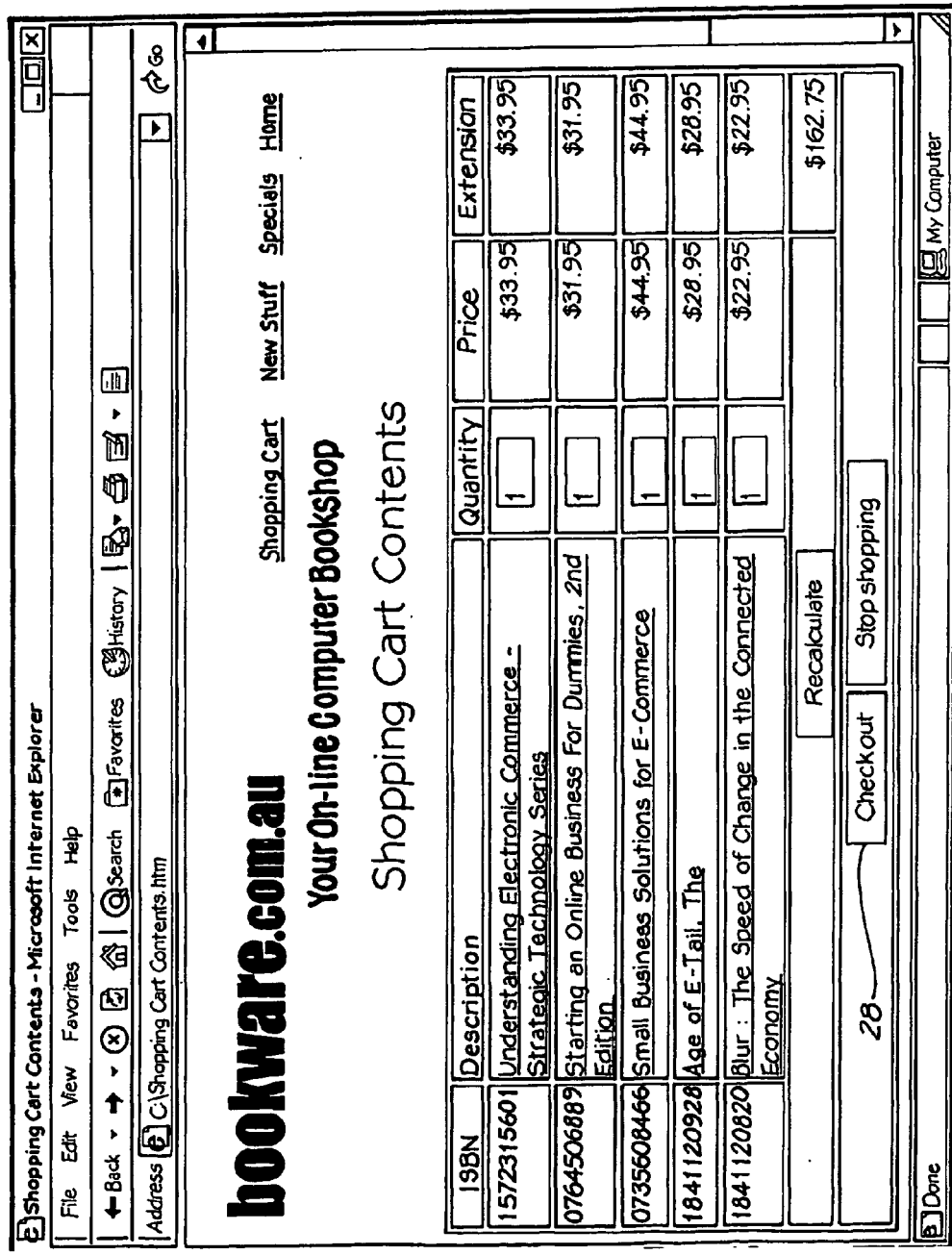
FIG. 4 is a screenshot illustrating a step of the Internet shopping process.

In this example an Internet shopper visits an online store 27 and fills the shopping cart with products of choice (FIG. 4). When ready to pay for the goods, the shopper clicks an appropriate button and is presented with the screen 30 shown in FIG. 5.

The financial institution issuing the card has provided the user with

A User ID

A key 10 or 20 as described above

A password (PIN)

The first step requires the user to enter the User ID in the appropriate Textbox 31.

The second step involves holding the key 10 against the screen so that the top left corner of the card is aligned with the top left corner 32 of the ruler image as indicated by the arrow 33.

The third step involves clicking the point on screen that coincides with the bottom right corner of the physical card held against the screen as indicated by the arrow and mouse icon 34 on the image. This action will submit the User ID and the physical size of the card (in pixels) to the web server with a request for a second web page 40 (FIG. 6).

The web server has a record of the User ID, user's PIN (or password) and the user's Key Sequence in a secure database. In addition, the server holds a series of random arrangements of ten digits (0–9) associated with the User ID and PIN.

Figure 6:
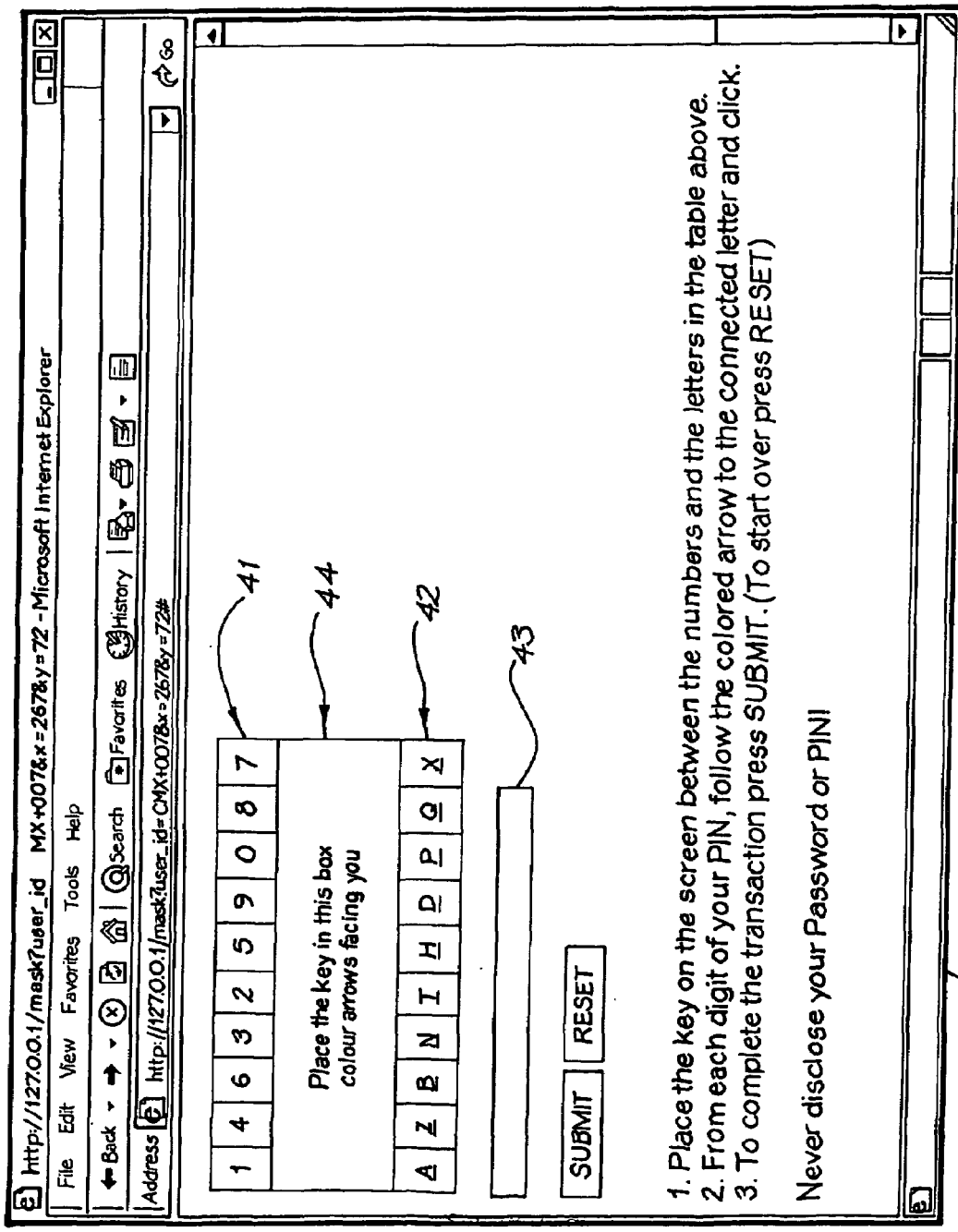
FIG. 6 is a screenshot illustrating the result of the first step of the validation process.

After receiving the submitted values from step three above, the server selects one of the random arrangements of ten digits (0–9) held against the User ID and adds it to the second web page 40 in the form of a challenge strip 41 as seen in FIG. 6, sequence shown here is '1,4 6 3 2 5 9 0 8 7'. The used random sequence of digits is then deleted from the database to avoid repeated use of the same sequence.

The second web page 40 also includes a response strip 42. The letters in the response strip respond to mouse clicks by appending their value into the text-box 43 below the response strip 42.

The server will also modify the size of the rectangle 44 between the numbers and letters to match the physical size of the user's Key by using the pixel values transmitted from previous web page 30.

Figure 7:
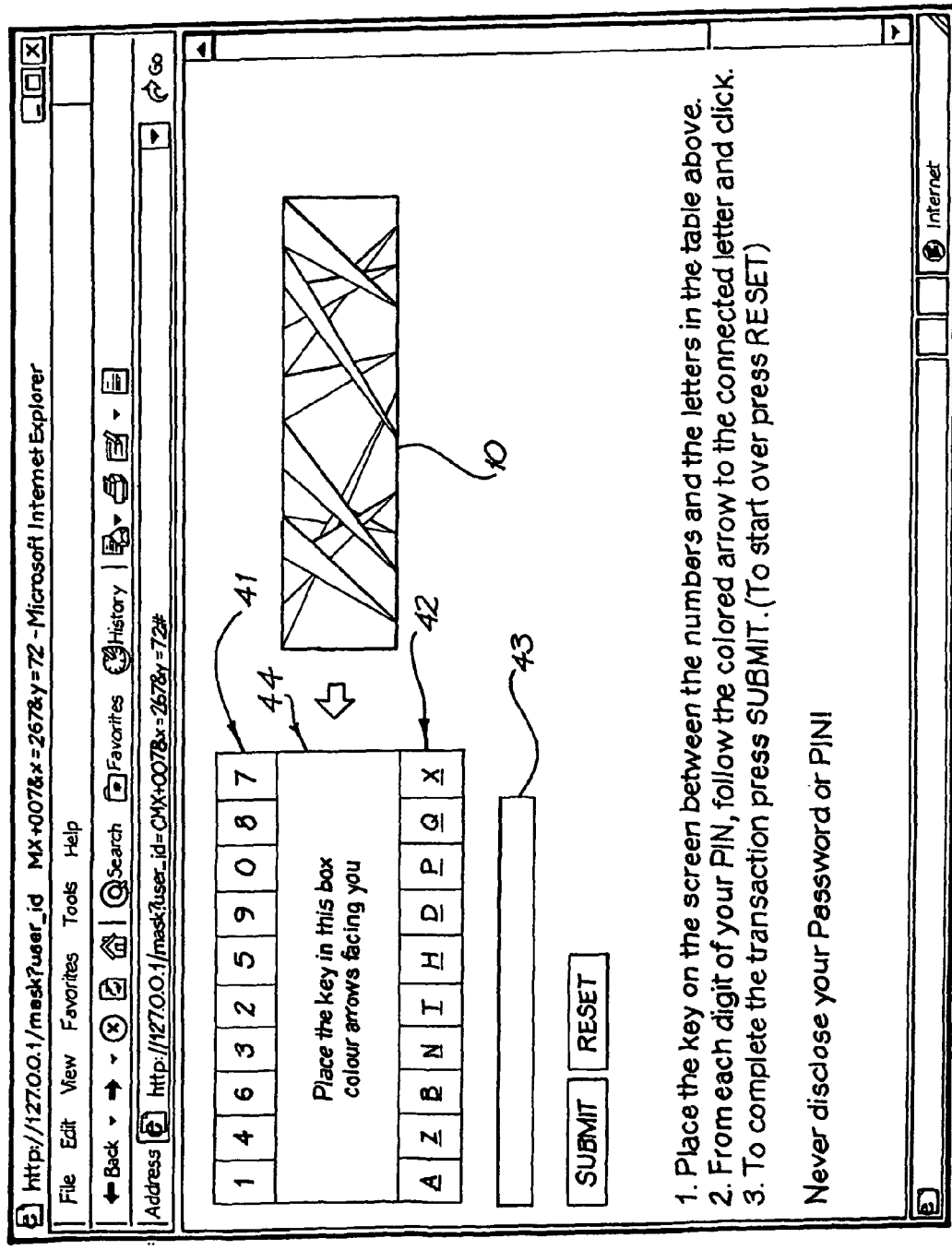
FIG. 7 is a screenshot illustrating the second step of the validation process using a first type key.

In the next step as illustrated in the screenshot 50 of FIG. 7, the user must align the physical Key 10 in their possession in the rectangle 44 between the random sequence of digits (0–9) and the response strip 42.

Since the rectangle 44 has been sized to match the physical dimensions of the Key 10, the process of alignment is simple and straightforward. The process of "calibration" will work reliably for most PC monitors set at any resolution because the actual physical dimensions of users Key 10 is captured in the first web page 30 on the same monitor at its current settings.

When aligned, the arrows 11 will correctly connect the digits with the letters on the response strip 42.

Figure 8:
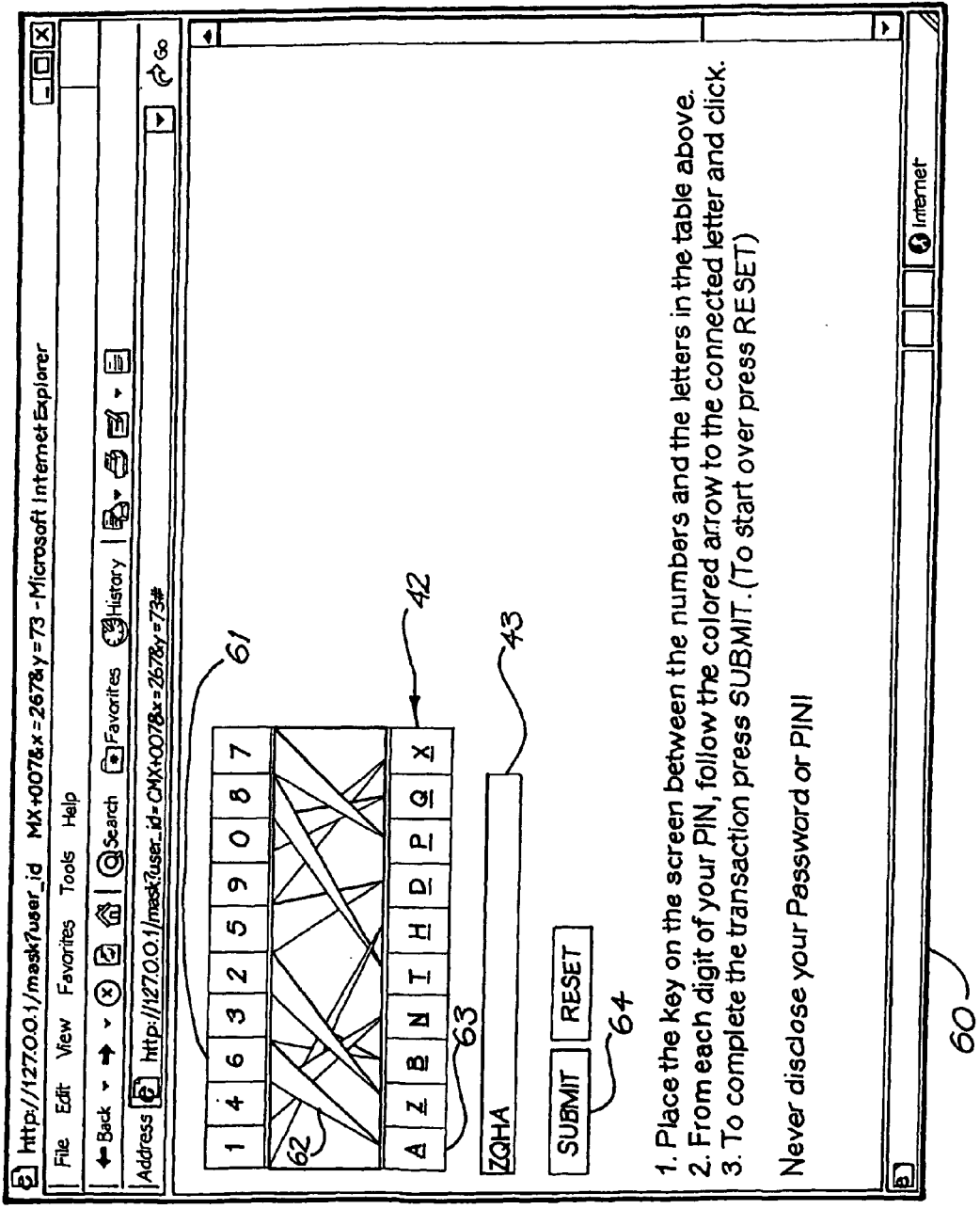
FIG. 8 is a screenshot illustrating the third step of the validation process using first type key.

After aligning the Key as illustrated in the screenshot 60 in FIG. 8, the user encodes the PIN (or password) by locating its digits on the random sequence (0–9) and following the arrows that connects each digit to respective letters on the response strip 42, clicking the letter. As the user clicks each letter its value is appended into the textbox 43 below the response strip. For instance, if the PIN contains the number '6' it can be seen to be the third number 61 in the sequence. Arrow 62 connects back to the first box 63 in response strip 42, and the user should click the letter inside box 83 to append its value in box 43. In FIG. 8 the PIN '2018' yields the encoded series 'ZQHA'.

When all the number of the PIN has been encoded the user clicks the submit button 64 to complete the transaction.

The encoded series that appear in the textbox 43 are transmitted to the server, which in turn applies the necessary logic to decode and compare them with a copy of users PIN held in its database.

If verification is successful the server applies the programmed business logic to approve or reject the transaction.

An alternative to transmitting the encoded series that appear in the textbox 43 is to use it as an encryption key for securing the shopping list and other relevant information. This method can also enhance an underlying encryption layer through the process of double encryption.

The Key 10 facilitates manual scrambling or encrypting of passwords and PIN numbers. The actual process of scrambling or encryption involves the user, depends on the presence of the Key and knowledge of the User ID and PIN.

The logical method used by the server to receive requests, issue challenges, verify responses and finally grant or withhold approval can be developed independently of the key, and can be varied to address different needs.

In general terms the server first receives a request in the form of a User ID (as well as the calibration data) and responds by presenting the user with a random sequence of displayable elements (challenge).

In the previous example the elements were simply the ten digits 0 to 9. However, any combination of characters, symbols, digits or graphic elements can be used. The Key is language independent and can be used with symbols and characters of any language including Chinees, Japanese, Korean (CJK) and Arabic. The number of elements can also change. Higher number of elements allows for more permutations and help to increase the security of the system. Here are some examples:

```
4  6  1  0  9  5  8  2  3  7
A  SN NQ E  AE S  PN T  ET QT
#  &  <  @  $  %  ?  +  >  *
✂  ✉  ✿  ▣  ❀  ☺  ✦  ✯  ♪  ✪
```

The random arrangements of the elements must avoid close similarity to minimise the risk of re-use of illegally intercepted values. A collection of ten elements can be arranged in 3,628,800 different ways (N=10!). However, any arrangements are very similar for example:

1 3 5 7 8 6 4 2 9 0
1 3 5 7 8 6 4 2 0 9
1 3 5 7 8 6 4 9 0 2

To avoid the risk of someone re-using an intercepted value with a closely similar permutation, the total number of permutations can be divided into smaller sets of dissimilar patterns and each set associated with a PIN. Each permutation within a set is only used once and when all combinations are used a new PIN can be issued and used with the same or a different permutation set.

Figure 5:
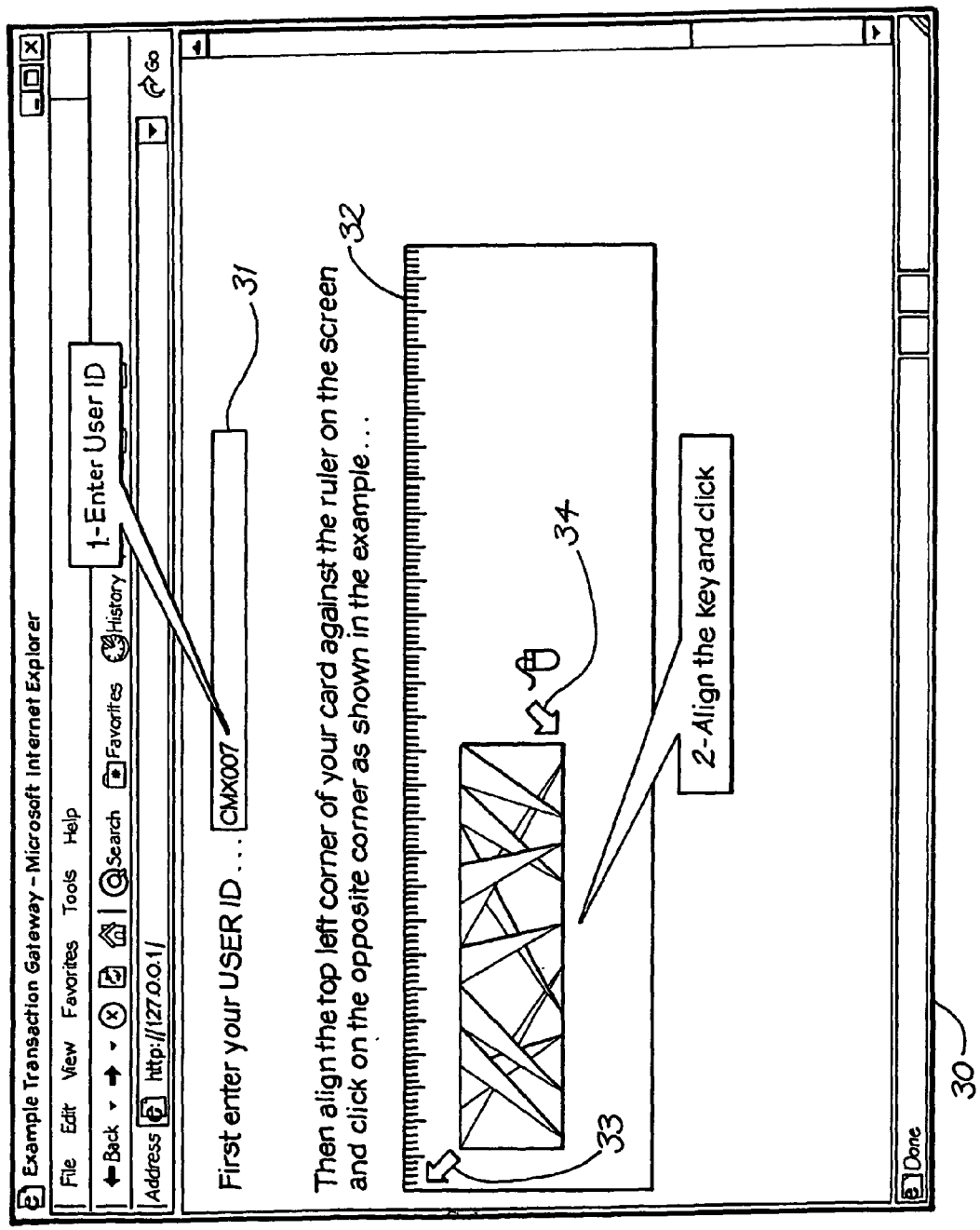
FIG. 5 is a screenshot illustrating the first step of the validation process using a first type key.

Using the submitted calibration data from first web page 30 in FIG. 5, the server must arrange the elements at the correct physical size so that all the required screen elements and the user's physical Key can be correctly aligned.

After the PIN is entered and submitted the server interprets the data and verifies the PIN. Depending on the applicable business rules, the server proceeds to approve or reject the transaction.

If necessary the implementation can employ extra security layers in the form of electronic processes such as encryption or procedural policies.

The examples above assume that the KEY is issued as a permanent device. However, it is possible to issue the users with a book of one-time disposable Keys. In this scenario the Key can be assigned a pre-defined dollar value to act as Electronic Cash or have the value defined by the user at the time of transaction to act a an Electronic Withdrawal Slip.

This invention is application-independent. The shape and size of the encoding device, screen representation of challenge and response elements, verification algorithm, administrative procedures such as dealing with successive wrong PIN entries and the communication methods can be varied to suit particular needs.

For example, it is possible to completely remove the merchant from the validation process by the use of digital invoices.

Any existing or new Policy can be employed to further enhance the security and minimise financial risks. Banks and financial institutions have existing policies that are time-tested and both operationally and legally well understood. Unlike many new Internet payment technologies, this invention can use the existing policies applicable to EFT and ATM technologies.

The simplicity, versatility and economy of the invention are reflected in the design of the two web pages that make up this demonstration. The source-code for theses two pages is included in Appendix A.

In a further example an online authentication system is designed to enhance e-commerce security. This simple system employs the method where possession (and presence) of a card and knowledge of a Personal Identification Number (PIN or password) form the basis for authentication and non-repudiation. This approach is similar to the authentication model used in EFTPOS and ATM transactions for more than two decades.

For the purpose of this example we shall assume the following:

Your name is James Bond (or Jane Bond). You are also known as The Customer.

Your financial institution is CMX Banking Corporation, also known as The Bank.

The Bank has issued you with a User ID, which is CMX007.

You have selected (or received) a Personal Identification Number.

Your PIN is 2016.

In FIG. 2 an encoding strip (Key) is incorporated in a standard credit card. It includes Fixed Values.

In FIG. 3 the same encoding strip (key) can b incorporated into personal cheques or traveler's cheques 25.

This represents an alternative to incorporating Relative Position indicators (arrows) into credit cards or other instruments.

The Bank may choose to issue the KEY as a self contained device instead of physically incorporating it into other instruments. In its shape and size, the self-contained KEY can resemble physical mil-keys we use to access buildings. FIG. 1 illustrates two examples:

Option A employs Relative Position indicators (arrows) while option B incorporates Fixed Values for encoding Personal Identification Numbers.

When the encoding devices are issued in the self-contained form as in the examples above, they are directly linked to the user. Incorporating encoders into credit cards link them directly to the cards and indirectly to the user. Both methods are valid and their selection is determined by relevant business rules.

After receiving our encoding KEY from the bank we can use it for buying goods and services on the Internet.

In the following pages actual screen shots will show how these devices can be used on the Internet.

The first step is to visit an online store and fill the shopping cart with a selection of goods. In FIG. 4 you have visited an online bookshop 27 and selected 5 books. Usually the delivery address and contact number are specified at this stage.

When ready to complete the purchase you click on a button or an icon 28 to indicate your intention to pay for the goods. Currently most secure e-commerce sites transfer the data via the Secure Socket Layer (SSL) in encrypted form. SSL is a mature technology and widely supported in browsers and web servers.

Figure 9:
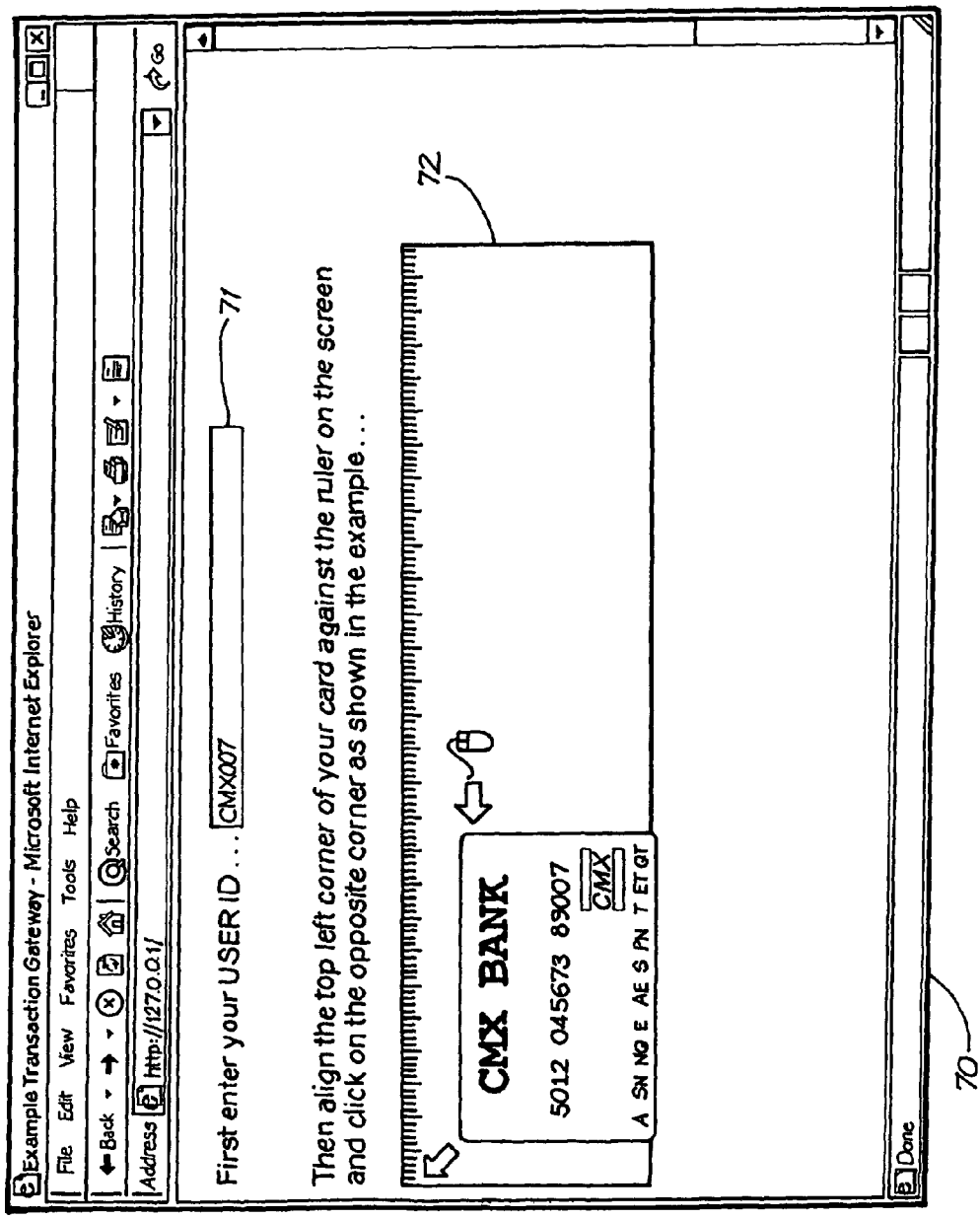

Upon receiving your request for payment, the merchant will send you the simple web page 70 shown in FIG. 9.

The screen includes a text box 71 where you enter your User ID. In his case CMX007.

The page also includes the image of a ruler 72. You are instructed to physically hold your credit card or the self-contained key against the screen. Aligning the top left corners of the card and the ruler and clicking on the position adjacent to the top right corner of your card. The ruler includes arrows and images to guide you.

Visual displays come in different physical sizes and are set at different screen resolutions. The process above is a calibration method that translates the size of the physical card into the number of pixels on the particular visual display in use.

As soon as you click on the ruler, your User ID and the size of your card in pixels are sent to the merchant.

The merchant forwards this information to the Bank either via the Internet or through the EFTPOS network or via other appropriate links.

The Bank verifies the User ID and returns the web page 80 shown in FIG. 10 to the merchant who forwards it to you.

The page includes a strip 81 containing digits 0 to 9 in random order. The strip has the same physical width as your cad.

Figure 11:
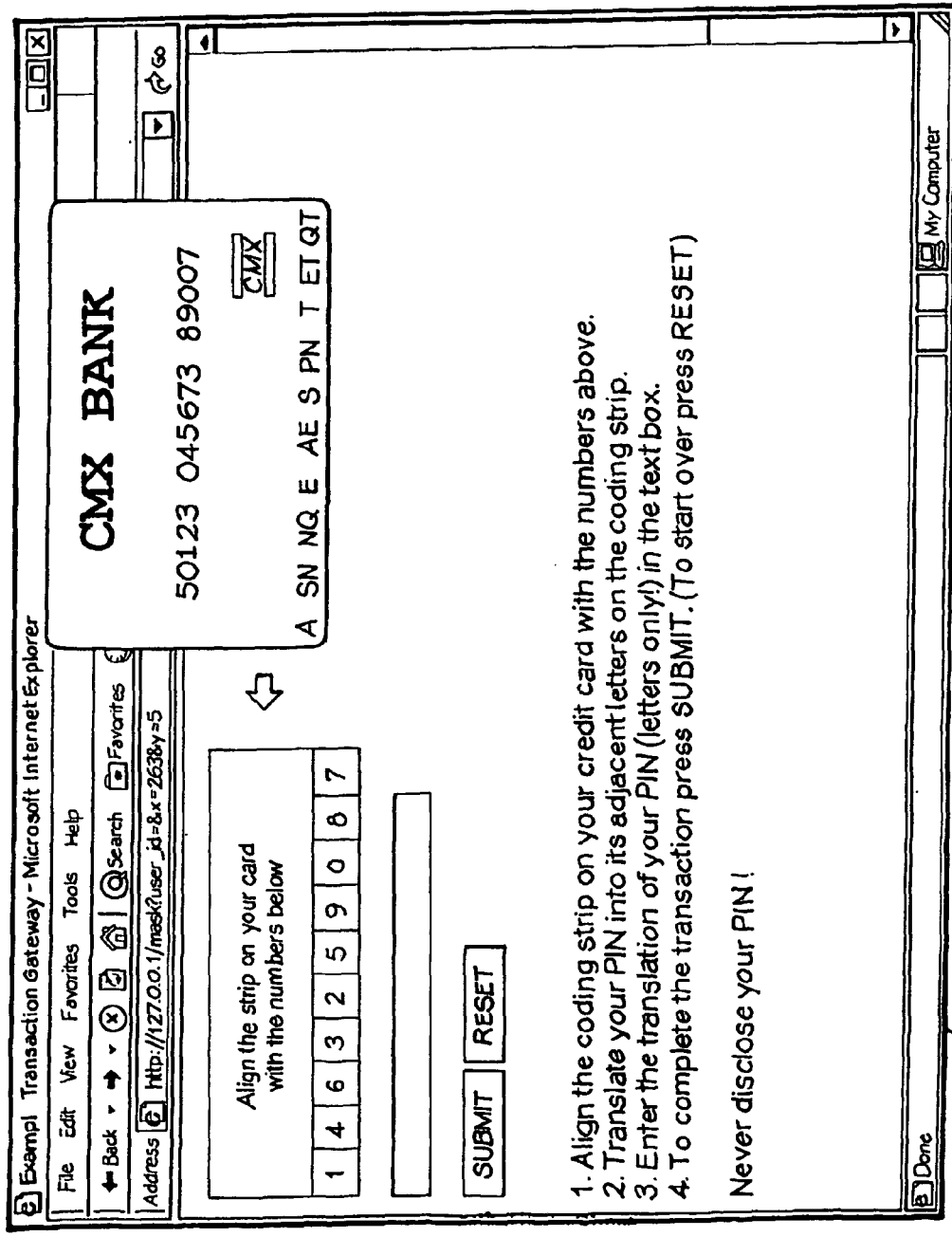

You are instructed to physically align the KEY and the strip of numbers on the visual display as illustrated in FIG. 11. This will connect the numbers on the display with the letters of the key printed on your card.

Figure 12:
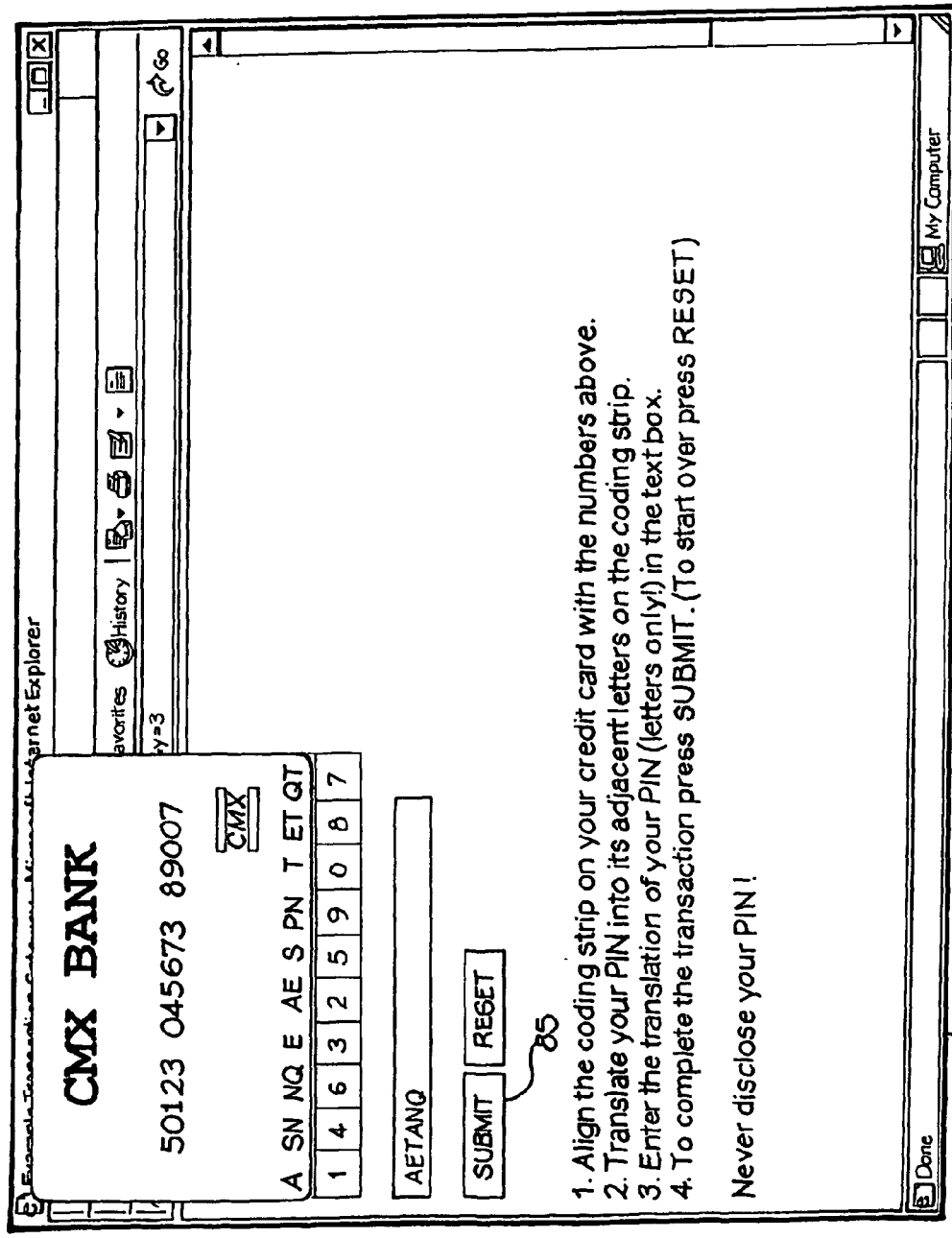

You are required to translate your PIN into letters using the numbers on the display and letters on your card then click on the SUBMIT button 85 to complete the transaction as illustrated in FIG. 12. The letters can be entered by the use of the computer's keyboard.

The translation of your PIN is sent to the merchant who forwards it to the Bank. The Bank has a record of the encoding strip printed on your card and the challenge strips containing random numbers. After verifying that the translation of your PIN is correct the bank send a transaction approval notice to the merchant.

An alternative to transmitting the translation of your PIN to the merchant is to use it as an encryption key for securing information relevant to the bank. This method hides the bank related information from the merchant. In addition, this method can also enhance an underlying encryption layer such as SSL through the process of double encryption.

To use this system the customer must have possession of the card, have knowledge of the User ID and PIN and be present to complete the transaction.

If customers protect their physical KEY the same way they protect their credit cards and do not disclose their user ID and PIN to anyone, this system provides an environment similar to EFTPOS or ATM where the presence of a card and knowledge of PIN satisfy the authentication and non-repudiation requirements of online transactions.

This invention is application-independent. The shape and size of the encoding device, screen representation of challenge and response elements, verification algorithm, administrative procedures such as dealing with successive wrong PIN entries and the communication methods can be varied to suit particular needs.

For example, it is possible to completely remove the merchant from the validation process by the use of digital invoices.

The invention has general applications beyond e-commerce also. Access to physical spaces and general User ID/Password authentication are two examples.

Where necessary future white papers will provide additional information.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Appendix A

The following is the actual HTML code for the two web pages featured in the previous illustration of how the KEY can be used for Internet shopping.

```
CALIBERATION PAGE
<HTML>
<HEAD><TITLE>Example Transaction Gateway</TITLE></HEAD>
<BODY>
<form ACTION="mask"><font face="arial">
<b>First enter your USER ID . . .</b><input type="text" name="user_id" size="36">
<br><br><br><font color="blue">
<b>Then align the top left corner of your card against the ruler on the screen<br>and click on
the opposite corner as shown in the example . . .</b></font>
<br><br>
<input type=image border=0 src="ruler.gif" url="test.htm">
</form>
</BODY>
</HTML>
VALIDATION PAGE
<HTML><HEAD><TITLE>Example Transaction Gateway</TITLE>
</head>
<BODY>
<table border cellspacing=%cellspacing% width= 266 height= 144 style="FONT-SIZE:
10pt">
<tr align="center" style="FONT-FAMILY: sans-serif">
<td width=10% height=25%>1
<td width=10%>4<td width=10%>6<td width=10%>3
<td width=10%>2<td width=10%>5<td width=10%>9
<td width=10%>0<td width=10%>8<td width=10%>7
<tr align="center">
<td colspan=10 width=10% height=50% bgcolor="white">
<font style="font-size:10pt; font-family:sans-serif,arial; font-weight:normal; color:red">
Place the key in this box<br>colour arrows facing you
<tr align="center" style="FONT-FAMILY: sans-serif">
<td width=10% height=25%><a href=# onclick="document.fillform.fillin.value =
document.fillform.fillin.value + 'A'">A</a>
<td width=10%><a href=# onclick="document.fillform.fillin.value =
document.fillform.fillin.value + 'Z'">Z</a>
```

-continued

```
<td width=10%><a href=# onclick="document.fillform.fillin.value =
document.fillform.fillin.value + 'B'">B</a>
<td width=10%><a href=# onclick="document.fillform.fillin.value =
document.fillform.fillin.value + 'N'">N</a>
<td width=10%><a href=# onclick="document.fillform.fillin.value =
document.fillform.fillin.value + 'T'">T</a>
<td width=10%><a href=# onclick="document.fillform.fillin.value =
document.fillform.fillin.value + 'H'">H</a>
<td width=10%><a href=# onclick="document.fillform.fillin.value =
document.fillform.fillin.value + 'D'">D</a>
<td width=10%><a href=# onclick="document.fillform.fillin.value =
document.fillform.fillin.value + 'P'">P</a>
<td width=10%><a href=# onclick="document.fillform.fillin.value =
document.fillform.fillin.value + 'Q'">Q</a>
<td width=10%><a href=# onclick="document.fillform.fillin.value =
document.fillform.fillin.value + 'X'">X</a>
</table>
<br>
<form name="fillform">
<input type="text" name="fillin" size="36" READONLY><br><br>
<input type="button" value="SUBMIT">
<input type="RESET" value="RESET">
</form>
<br>
<font size=3 face="arial" color="Blue"><b>
1. Place the key on the screen between the numbers and the letters in the table above.<br>
2. From each digit of your PIN, follow the colored arrow to the connected letter and click.<br>
3. To complete the transaction press SUBMIT. (To start over press RESET)
</b></font><br><br>
<font size=3 face="arial" color="Red"><b>Never disclose your Password or PIN!</b>
</font>
</BODY>
</HTML>
```

The invention claimed is:

1. A method of validation for transactions between a user terminal and a server, including the steps of:
providing a code word made up of a first series of elements to a user;
providing a key to the user to use to scramble the code word;
holding the code word and key securely at the server;
receiving a request communication at the server from a user terminal;
responding to the request by issuing a second series of elements from the server to the user terminal;
displaying the second series of elements at the terminal;
inviting the user to enter a scrambled version of the code word by selecting the elements of the first series in order from the second series and for each element selected making an entry at the terminal in dependence on the key to create a series of entries; and
using the series of entries to validate the transaction.

2. A method according to claim 1, where the request communication takes the form of a User ID entered at the terminal, and the code word is a PIN.

3. A method according to claim 1 or 2, where the second series of elements is a random series of elements.

4. A method according to claim 1, where the key includes a physical body bearing visible indicia connecting pairs of points each of which is located at an internal or external edge of the body.

5. A method according to claim 4, where the scrambled version of the code word is entered by using the key to co-relate the position of a point on a visual display to the position of a second point on the same display by holding the key against the screen.

6. A method according to claim 4, where the request communication includes calibration data for the terminal generated by the user making entries depending on the size, shape or configuration of the physical body of the key.

7. A method according to claim 6, where the server uses the calibration data to display the second series of elements and a series of entry buttons at the terminal such that the key may be positioned on the terminal to link the elements of the second series with respective entry buttons.

8. A method according to claim 7, where the user enters a scrambled version of the code word by selecting the elements of the first series in order from the second series, and for each element selected clicking in the respective entry button to make a series of entries.

9. A method according to claim 1, where the key displays information along an edge of the key, or near apertures in the key.

10. A method according to claim 1, where the scrambled version of the code word is entered by aligning information displayed on the key with the second series of elements displayed on the user terminal, then making entries from the information displayed on the key to select elements of the first series.

11. A method according to claim 1, further including transmitting the series of entries made at the terminal to the server; unscrambling the entries at the server to recover the code word and, using knowledge of the second series and the key, to validate the user.

12. A method according to claim 11, where transmitting the series of entries involves transmitting a scrambled version of the code word.

13. A method according to claim 1, further including using the series of entries made at the terminal to encrypt a transmission to the server; and decrypting the transmission at the server.

14. A computer network, server or terminal adapted for performing the method of claim 1.

* * * * *